(12) United States Patent
Cheikh et al.

(10) Patent No.: US 9,460,572 B2
(45) Date of Patent: Oct. 4, 2016

(54) PORTABLE USER CONTROL SYSTEM AND METHOD THEREFOR

(71) Applicant: SITA Information Networking Computing Ireland Limited, Letterkenny (IE)

(72) Inventors: Stephane Cheikh, Geneva (CH); Renaud Irminger, Geneva (CH); Kevin O'Sullivan, Hove (GB); Michael Garry Kelly, Dublin (IE)

(73) Assignee: SITA Information Networking Computing Ireland Limited, Letterkenny (IE)

( * ) Notice: Subject to any disclaimer, the term of this patent is extended or adjusted under 35 U.S.C. 154(b) by 0 days.

(21) Appl. No.: 14/304,150

(22) Filed: Jun. 13, 2014

(65) Prior Publication Data

US 2014/0369570 A1    Dec. 18, 2014

Related U.S. Application Data

(60) Provisional application No. 61/835,258, filed on Jun. 14, 2013.

(30) Foreign Application Priority Data

Mar. 6, 2014    (GB) .................................. 1403967.1

(51) Int. Cl.
*G06K 9/00*    (2006.01)
*G06K 7/00*    (2006.01)
(Continued)

(52) U.S. Cl.
CPC ......... *G07C 9/00031* (2013.01); *G02B 27/017* (2013.01); *G06K 5/00* (2013.01);
(Continued)

(58) Field of Classification Search
USPC .................. 382/116, 312; 348/156; 235/384
See application file for complete search history.

(56) References Cited

U.S. PATENT DOCUMENTS 4,821,118 A * 4/1989 Lafreniere ......... G07C 9/00079
348/150
5,051,565 A * 9/1991 Wolfram ................. B64F 1/366
235/375

(Continued)

FOREIGN PATENT DOCUMENTS

CN    101436185 A    5/2009
DE    10357831 A1    7/2005

(Continued)

OTHER PUBLICATIONS

Search Report of Singapore Application No. 201306353-2, received from the Danish Patent and Trademark Office on Jun. 16, 2014.

(Continued)

*Primary Examiner* — Kathleen Y Dulaney
(74) *Attorney, Agent, or Firm* — Morris, Manning & Martin, LLP; Daniel E. Sineway, Esq.; R. Lee Strasburger, Jr., Esq.

(57) ABSTRACT

A portable control system for use by an agent in the travel industry and the like is disclosed. A reader reads user data from a user identity document and also reads further user data from a token associated with a product or service. A display is provided for displaying a field of view for the agent. In response to the agent positioning the user identity document and token within the field of view, the reader reads the user data from the document and reads the further user data from the token and compares the user data and further user data.

17 Claims, 8 Drawing Sheets

(51) Int. Cl.
*G07B 15/02* (2011.01)
*H04N 7/18* (2006.01)
*G07C 9/00* (2006.01)
*G06K 5/00* (2006.01)
*G06Q 10/02* (2012.01)
*G02B 27/01* (2006.01)
*G06F 3/01* (2006.01)
*G06F 3/0481* (2013.01)

(52) U.S. Cl.
CPC ......... *G06Q 10/02* (2013.01); *G07C 9/00079* (2013.01); *G02B 2027/014* (2013.01); *G06F 3/011* (2013.01); *G06F 3/0481* (2013.01)

(56) References Cited

U.S. PATENT DOCUMENTS

| | | | |
|---|---|---|---|
| 5,270,921 A | 12/1993 | Hornick | |
| 5,787,186 A * | 7/1998 | Schroeder | G06K 9/00221 235/380 |
| 5,918,209 A | 6/1999 | Campbell et al. | |
| 5,920,053 A | 7/1999 | DeBrouse | |
| 6,108,636 A * | 8/2000 | Yap et al. | 705/5 |
| 6,112,185 A | 8/2000 | Walker et al. | |
| 6,119,096 A | 9/2000 | Mann et al. | |
| 6,137,895 A * | 10/2000 | Al-Sheikh | A45C 13/42 235/384 |
| 6,158,658 A | 12/2000 | Barclay | |
| 6,192,416 B1 | 2/2001 | Baxter | |
| 6,367,016 B1 | 4/2002 | Lambert et al. | |
| 6,661,340 B1 * | 12/2003 | Saylor | G08B 25/016 340/3.3 |
| 6,695,203 B2 * | 2/2004 | Iki | G07B 15/00 235/375 |
| 6,760,778 B1 | 7/2004 | Nelson et al. | |
| 6,779,720 B2 * | 8/2004 | Lewis | G06Q 10/02 235/375 |
| 6,869,023 B2 | 3/2005 | Hawes | |
| 7,035,828 B2 | 4/2006 | Ketonen et al. | |
| 7,212,978 B2 | 5/2007 | Kowal et al. | |
| 7,258,276 B2 | 8/2007 | Linton et al. | |
| 7,327,262 B2 | 2/2008 | Motteram et al. | |
| 7,421,319 B2 | 9/2008 | Stefani | |
| 7,440,967 B2 | 10/2008 | Chidlovskii | |
| 7,454,203 B2 | 11/2008 | Levitan | |
| 7,483,696 B1 | 1/2009 | Mitchell | |
| 7,486,960 B2 | 2/2009 | Brady, Jr. et al. | |
| 7,539,985 B2 | 5/2009 | Marvin | |
| 7,571,206 B2 | 8/2009 | Koning et al. | |
| 7,607,080 B2 | 10/2009 | Heuer et al. | |
| 7,664,672 B1 | 2/2010 | Walker et al. | |
| 7,668,873 B2 | 2/2010 | Davis et al. | |
| 7,685,009 B2 | 3/2010 | Halavais et al. | |
| 7,702,328 B2 | 4/2010 | Lemond et al. | |
| 7,720,724 B2 | 5/2010 | Kurashige | |
| 7,739,292 B2 | 6/2010 | Falk et al. | |
| 7,786,899 B2 | 8/2010 | Baker et al. | |
| 7,805,523 B2 | 9/2010 | Mitchell et al. | |
| 7,870,101 B2 | 1/2011 | Hubbard et al. | |
| 7,882,137 B2 | 2/2011 | Lepman | |
| 7,907,067 B2 | 3/2011 | Baker et al. | |
| 7,907,545 B2 | 3/2011 | Ric | |
| 7,949,335 B2 | 5/2011 | Stefani et al. | |
| 7,954,712 B2 | 6/2011 | Babcock et al. | |
| 8,001,519 B2 | 8/2011 | Conallen et al. | |
| 8,058,972 B2 * | 11/2011 | Mohanty | B42D 25/00 340/5.53 |
| 8,087,583 B2 | 1/2012 | Hawes | |
| 8,090,603 B2 | 1/2012 | Payne et al. | |
| 8,117,051 B2 | 2/2012 | Sauvage et al. | |
| 8,160,759 B2 | 4/2012 | Baker et al. | |
| 8,165,809 B1 | 4/2012 | Baker et al. | |
| 8,170,535 B1 | 5/2012 | Lopes et al. | |
| 8,195,151 B2 | 6/2012 | Cerra, II et al. | |
| 8,214,144 B2 | 7/2012 | Baker et al. | |
| 8,229,458 B2 | 7/2012 | Busch | |
| 8,296,281 B2 | 10/2012 | Baker et al. | |
| 8,332,136 B2 | 12/2012 | Baker et al. | |
| 8,582,733 B1 * | 11/2013 | Larson | H04M 11/00 379/201.01 |
| 8,606,508 B2 | 12/2013 | Baker et al. | |
| 8,713,661 B2 | 4/2014 | Vysogorets et al. | |
| 2002/0091555 A1 * | 7/2002 | Leppink | G06Q 10/02 705/5 |
| 2002/0138625 A1 | 9/2002 | Bruner et al. | |
| 2003/0034390 A1 | 2/2003 | Linton et al. | |
| 2003/0048471 A1 | 3/2003 | Lundgren | |
| 2003/0089764 A1 * | 5/2003 | Meadow | G06Q 20/341 235/375 |
| 2003/0130769 A1 | 7/2003 | Farley et al. | |
| 2003/0146871 A1 | 8/2003 | Karr et al. | |
| 2003/0150922 A1 * | 8/2003 | Hawes | G06F 3/0317 235/494 |
| 2003/0220116 A1 | 11/2003 | Sagefalk et al. | |
| 2004/0030855 A1 | 2/2004 | Takeuchi et al. | |
| 2004/0039617 A1 | 2/2004 | Maycotte et al. | |
| 2004/0093349 A1 * | 5/2004 | Buinevicius | G06Q 10/00 |
| 2004/0128193 A1 | 7/2004 | Brice et al. | |
| 2004/0249836 A1 | 12/2004 | Reynders et al. | |
| 2005/0004919 A1 | 1/2005 | Green et al. | |
| 2005/0033666 A1 | 2/2005 | Kurashige | |
| 2005/0071206 A1 | 3/2005 | Berge | |
| 2005/0228702 A1 | 10/2005 | Fairbanks et al. | |
| 2005/0258230 A1 * | 11/2005 | Wiater | G06Q 10/087 235/375 |
| 2005/0258247 A1 | 11/2005 | Hawes | |
| 2006/0004781 A1 | 1/2006 | Burgel et al. | |
| 2006/0085451 A1 | 4/2006 | Pal et al. | |
| 2006/0095434 A1 | 5/2006 | McCullough et al. | |
| 2006/0097046 A1 | 5/2006 | Baru Fassio et al. | |
| 2006/0117186 A1 * | 6/2006 | Yeo | G06Q 10/02 713/182 |
| 2006/0173680 A1 * | 8/2006 | Verhasselt | G10L 15/22 704/235 |
| 2006/0238384 A1 | 10/2006 | Hess et al. | |
| 2006/0259456 A1 | 11/2006 | Falk et al. | |
| 2006/0288021 A1 | 12/2006 | Kojima et al. | |
| 2007/0055416 A1 | 3/2007 | Allen | |
| 2007/0072590 A1 | 3/2007 | Levitan | |
| 2007/0111725 A1 | 5/2007 | Kauffman et al. | |
| 2007/0149216 A1 | 6/2007 | Misikangas | |
| 2007/0157078 A1 | 7/2007 | Anderson | |
| 2007/0198314 A1 | 8/2007 | Andrew et al. | |
| 2007/0222595 A1 | 9/2007 | Motteram et al. | |
| 2007/0233617 A1 | 10/2007 | Gillespie | |
| 2007/0244766 A1 | 10/2007 | Goel | |
| 2007/0250356 A1 | 10/2007 | Douglas | |
| 2007/0265881 A1 | 11/2007 | El Eman et al. | |
| 2007/0273514 A1 | 11/2007 | Winand et al. | |
| 2007/0276944 A1 * | 11/2007 | Samovar | G07C 9/00103 709/225 |
| 2008/0015926 A1 | 1/2008 | Marcken | |
| 2008/0027765 A1 | 1/2008 | Gunn et al. | |
| 2008/0027955 A1 | 1/2008 | May et al. | |
| 2008/0046298 A1 | 2/2008 | Ben-Yehuda et al. | |
| 2008/0065480 A1 | 3/2008 | Baker et al. | |
| 2008/0070517 A1 | 3/2008 | Brady et al. | |
| 2008/0091445 A1 | 4/2008 | Mihic | |
| 2008/0099552 A1 | 5/2008 | Grillion | |
| 2008/0140226 A1 | 6/2008 | Ganev | |
| 2008/0140434 A1 | 6/2008 | O'Brien | |
| 2008/0224823 A1 | 9/2008 | Lawson et al. | |
| 2008/0229228 A1 | 9/2008 | Cohen | |
| 2009/0010200 A1 | 1/2009 | Lauer et al. | |
| 2009/0015398 A1 | 1/2009 | Bhogal et al. | |
| 2009/0030781 A1 | 1/2009 | Mehta et al. | |
| 2009/0033491 A1 | 2/2009 | Saunders | |
| 2009/0063219 A1 | 3/2009 | Raufaste et al. | |
| 2009/0070841 A1 | 3/2009 | Buga et al. | |
| 2009/0112473 A1 * | 4/2009 | Lu | G06Q 30/02 701/300 |
| 2009/0164500 A1 | 6/2009 | Mathur et al. | |
| 2009/0182590 A1 | 7/2009 | Ashby et al. | |
| 2009/0187494 A1 | 7/2009 | Heath | |

(56) References Cited

U.S. PATENT DOCUMENTS

| | | |
|---|---|---|
| 2009/0196201 A1 | 8/2009 | Ric |
| 2009/0256675 A1* | 10/2009 | Kerr .................. H04L 63/102 340/5.54 |
| 2009/0259549 A1 | 10/2009 | Winand et al. |
| 2009/0287513 A1 | 11/2009 | Anderson et al. |
| 2009/0307020 A1 | 12/2009 | Viale et al. |
| 2009/0310530 A1 | 12/2009 | Cerra, II et al. |
| 2010/0027461 A1 | 2/2010 | Bothorel |
| 2010/0030591 A1 | 2/2010 | Viard et al. |
| 2010/0065632 A1 | 3/2010 | Babcock et al. |
| 2010/0076795 A1 | 3/2010 | Steir et al. |
| 2010/0076826 A1 | 3/2010 | Bayne |
| 2010/0078475 A1* | 4/2010 | Lin .................... B64F 1/366 235/380 |
| 2010/0159871 A1 | 6/2010 | Tester |
| 2010/0170947 A1* | 7/2010 | Christofferson ...... G06Q 10/02 235/382 |
| 2010/0190510 A1 | 7/2010 | Maranhas et al. |
| 2010/0191782 A1* | 7/2010 | Brzozowski ...... G06F 17/30067 707/822 |
| 2010/0198628 A1 | 8/2010 | Rayner |
| 2010/0205448 A1 | 8/2010 | Tarhan et al. |
| 2010/0245034 A1 | 9/2010 | D'Oliveiro et al. |
| 2010/0268656 A1 | 10/2010 | Teicher |
| 2010/0332358 A1 | 12/2010 | Owens |
| 2011/0018769 A1 | 1/2011 | Misikangas et al. |
| 2011/0028160 A1 | 2/2011 | Roeding et al. |
| 2011/0227737 A1* | 9/2011 | Kamins ............... G07C 9/00087 340/573.1 |
| 2012/0035965 A1 | 2/2012 | Maguire et al. |
| 2012/0075168 A1 | 3/2012 | Osterhout et al. |
| 2012/0129546 A1 | 5/2012 | Yang et al. |
| 2012/0199653 A1 | 8/2012 | Wenzel |
| 2012/0200390 A1* | 8/2012 | Saravanan .......... G07C 9/00111 340/5.61 |
| 2012/0203578 A1 | 8/2012 | Baggett et al. |
| 2012/0284108 A1 | 11/2012 | Fontana et al. |
| 2013/0069985 A1 | 3/2013 | Wong et al. |
| 2013/0141313 A1 | 6/2013 | Zhou et al. |
| 2013/0211864 A1* | 8/2013 | Sanderson et al. ................ 705/5 |
| 2013/0234849 A1 | 9/2013 | Gupta et al. |
| 2013/0267255 A1 | 10/2013 | Liu et al. |
| 2013/0295966 A1 | 11/2013 | Dingler et al. |
| 2013/0297103 A1 | 11/2013 | Baker et al. |
| 2013/0305059 A1* | 11/2013 | Gormley .................. G07F 7/08 713/189 |
| 2013/0325526 A1 | 12/2013 | Tyler |
| 2014/0006070 A1 | 1/2014 | Stamler |
| 2014/0039717 A1 | 2/2014 | Henkel |
| 2014/0052482 A1 | 2/2014 | Le Marier et al. |
| 2014/0067244 A1 | 3/2014 | Baker et al. |
| 2014/0123315 A1 | 5/2014 | Baker et al. |
| 2014/0162598 A1* | 6/2014 | Villa-Real ............... H04M 1/66 455/411 |

FOREIGN PATENT DOCUMENTS

| | | |
|---|---|---|
| EP | 1318463 A1 | 6/2003 |
| EP | 1454306 A2 | 6/2003 |
| EP | 1 610 094 A1 | 12/2005 |
| EP | 1679624 A2 | 7/2006 |
| EP | 1874001 B1 | 1/2008 |
| EP | 2222053 A1 | 8/2010 |
| EP | 2290600 A2 | 3/2011 |
| EP | 2 390 845 A1 | 11/2011 |
| EP | 2474931 A1 | 7/2012 |
| GB | 2366945 A | 3/2002 |
| GB | 2 418 511 A | 3/2006 |
| GB | 2408131 B1 | 3/2006 |
| GB | 2469026 A | 10/2010 |
| GB | 2470897 A | 12/2010 |
| GB | 2501144 A | 10/2013 |
| JP | 2006053724 A | 2/2006 |
| JP | 2005135199 A | 5/2006 |
| JP | 2008117340 A | 5/2008 |
| JP | 2008171181 A | 7/2008 |
| JP | 2009093603 A | 4/2009 |
| WO | 0073954 A2 | 12/2000 |
| WO | 0135269 A2 | 5/2001 |
| WO | 0135289 A1 | 5/2001 |
| WO | 0157323 A1 | 8/2001 |
| WO | 02/15582 A1 | 2/2002 |
| WO | 03005237 A1 | 1/2003 |
| WO | 2004045106 A1 | 3/2004 |
| WO | 2008/055181 A2 | 5/2008 |
| WO | 2009002139 A1 | 12/2008 |
| WO | 2009021068 A1 | 2/2009 |
| WO | 2009058505 A1 | 5/2009 |
| WO | 2009091553 A1 | 7/2009 |
| WO | 2011057323 A1 | 5/2011 |
| WO | 2012105829 A2 | 8/2012 |
| WO | 2013079512 A1 | 6/2013 |

OTHER PUBLICATIONS

Written Opinion of Singapore Application No. 201306353-2, received from the Danish Patent and Trademark Office on Jun. 16, 2014.

International Search Report of PCT/EP2014/062464, received from the European Patent Office on Sep. 11, 2014.

Written Opinion of PCT/EP2014/062464, received from the European Patent Office on Sep. 11, 2014.

Kinneging, T. Machine Readable Travel Documents-Technical Report: PKI for Machine Readable Travel Documents Offering ICC Read-Only Access, PKI Task Force, International Civil Aviation Organization, Version 1.1, Oct. 1, 2004.

International Search Report and Written Opinion of the International Search Authority (EPO) for PCT/EP2013/057497 (Jun. 27, 2013).

International Civil Aviation Organization, Machine Readable Travel Documents, Part 1, Machine Readable Passports—vol. 1, Passports with Machine Readable Data Stored in Optical Character Recognition Format, Sixth Edition, 99 pages, 2006.

International Civil Aviation Organization, Machine Readable Travel Documents, Part 1, Machine Readable Passports—vol. 2, Specifications for Electronically Enabled Passports with Biometric Identification Capability, Sixth Edition, 99 pages, 2006.

International Civil Aviation Organization, Machine Readable Travel Documents, Part 3, Machine Readable Official Travel Documents—vol. 1, MRtds with Machine Readable Data Stored in Optical Character Recognition Format, Third Edition, 122 pages, 2008.

Danish Patent and Trademark Office, Written Opinion of Singapore Application No. 201301978-1, dated Oct. 15, 2013.

Hungarian Intellectual Property Office, Search Report of Singapore Application No. 201301980-7, dated Sep. 3, 2013.

Hungarian Intellectual Property Office, Written Opinion of Singapore Application No. 201301980-7, dated Sep. 3, 2013.

International Civil Aviation Organization, Machine Readable Travel Documents, Part 3, Machine Readable Official Travel Documents—vol. 2, Specifications for Electronically Enabled MRtds with Biometric Identification Capability, Third Edition, 149 pages, 2008.

Dunkel, Jurgen, et al., Model-Driven Architecture for Mobile Applications, pp. 464-477, Hannover University of Applied Sciences and Arts, Department of Computer Sciences, Hannover, Germany.

Glushko, Robert J., et al., Bridging the "Front Stage" and "Back Stage" in Service System Design, pp. 1-10, 2008, University of California, Berkely, School of Information, Proceedings of the 41st Hawaii International Conference on System Sciences, Institute of Electrical and Electronics Engineers (IEEE).

Johnston, Michael, et al., Multimodal Applications from Mobile to Kiosk, 4 pages, AT&T Research, Florham Park, New Jersey, USA.

Kindervater, Gerard, Revenue Management in the Airline Passenger Industry, 24 pages, AirFrance KLM.

Li, Quanzhong, et al., XVM: A Bridge Between XML Data and Its Behavior, 9 pages, May 17-22, 2004, 13th International Conference on World Wide Web, New York, New York, USA.

Madria, Sanjay, An XML Schema integration and query mechanism system, pp. 266-303, 2007, Elsevier B.V., Science Direct, Data & Knowledge Engineering 65 (2008).

(56) References Cited

OTHER PUBLICATIONS

McGuire, Kelly A., et al., The Future of Revenue Management, 5 pages, 2009, SAS Global Forum 2009, SAS Institute Inc.
Smith, Barry C., et al., Yield Management at American Airlines, p. 8-31, 1992, American Airlines Decision Technologies, Dallas/Fort Worth Airport, Texas, USA.
Xu, Liping, et al., A Model of Capacity Control with Overbooking for a Two-leg Airlines Network, 5 pages, 2008, Institute of Electrical and Electronics Engineers (IEEE).
Marmasse, M., et al., Location-aware information delivery with comMotion, MIT Media Laboratory, Cambridge, MA, HUC 2000 Proceedings, p. 157-171, Springer-Verlag.
Chen, G., et al., A Survey of Context-Aware Mobile Computing Research, Darmouth College, Department of Computer Science, TR2000-381, p. 1-16, Hanover, New Hampshire.
Munoz, M. et al., Context-Aware Mobile Communication in Hospitals, IEEE Computer Society, p. 38-46, Sep. 2003.
Schwinger, W., et al., Context-awareness in Mobile Tourism Guides—A Comprehensive Survey, Austin Federal Ministry for Education, Science, and Culture, and the European Social Fund, p. 1-20, 2002.
Sam Schechner, "Airlines Entertain Tablet Ideas—Rather Than Wiring Planes for In-Flight Movies, Some Hand Out iPads", http://online.wsj.com/articles/SB10000872396390443916104578020601759253578, Sep. 2012.
Mary Kirby, "Personal Services—In-flight connectivity poised to change the passenger experience for ever", http://www.flightglobal.com/news/articles/personal-services-in-flight-connectivity-poised-to-change-the-passenger-experience-for-332765/, Sep. 2009.
Lawrence Kitson, "The Future of In-flight: Part Two—The Concierge Concept", http://ustwo.com/blog/the-future-of-in-flight-part-two-the-concierge-concept/, Apr. 2012.
Examination Report of Malaysian Application No. 2013001405, received from the Intellectual Property Corporation of Malaysia on Oct. 28, 2014.
Singapore Search Report of Application No. 201306353-2, mailed on Apr. 11, 2014, by the Danish Patent and Trademark Office.
Singapore Written Opinion of Application No. 201306353-2, received on Apr. 11, 2014, by the Danish Patent and Trademark Office.
Susan Stellin, "Automation Is Considered for Checking IDs in Airports", Business Day, *The New York Times*, Mar. 19, 2012, 3 pages, retrieved Sep. 4, 2014, http://www.nytimes.com/2012/03/20/business/tsa-is-considering-automating-id-checks.html.
Robert Longley, "TSA's New ID, Boarding Pass Scanning System Draws Criticism", US Government, About.com, Aug. 2, 2012, 2 pages, retrieved online on Jul. 30, 2014, http://usgovinfo.about.com/od/defenseandsecurity/a/Tsa-Boarding-Pass-Scanning-System-Draws-Criticism.htm#&newsissues&newsissues.
Search Report of Application No. GB 1403967.1, received from the UK Intellectual Property Office on Aug. 4, 2014.
Examination Opinion of Application No. GB 1403967.1, received from the UK Intellectual Property Office on Aug. 5, 2014.
AIRCOM Server Administrator Guide, SITA Airline Telecommunications and Information Services, Feb. 19, 2013, pp. 1-280.
AIRCOM Server User Guide, SITA Airline Telecommunications and Information Services, Jan. 24, 2013, pp. 1-153.
Examination Report received in Malaysian Application No. PI 2013000936.
International Search Report and the Written Opinion mailed in International Application No. PCT/EP2013/052590 filed Aug. 2, 2013.
International Search Report and Written Opinion mailed in International Application No. PCT/EP2011/070551 filed Nov. 21, 2011.
International Search Report and Written Opinion mailed in International Application No. PCT/EP2015/053319 filed Feb. 17, 2015.
International Search Report mailed in International Application No. PCT/EP2011/072286 filed on Sep. 12, 2011.
Russian Search Report for 2013133853/08(050668) mailed Feb. 20, 2015.
Search Report and Examination Opinion mailed in International Application No. GB1421313.6.
International Search Report mailed on May 16, 2016 in Singapore Patent Application No. 11201509772X.

* cited by examiner

PORTABLE USER CONTROL SYSTEM AND METHOD THEREFOR

FIELD OF THE INVENTION

This invention relates in general to a user control system or security system, such as a gate control system. More particularly, this invention relates to a user control system for passengers who are required to have a passport, official travel document or other identity document certifying the passenger's identity in order to travel to their destination. More specifically, this invention relates to a user control system for streamlining or expediting passenger processing through security or boarding an aircraft.

BACKGROUND OF THE INVENTION

Typically, at some point prior to a passenger's departure on a flight, a security check is performed to verify that a passenger's name on a boarding pass matches the name on their passport or identity document.

A boarding pass is usually a paper document with the passenger's name, flight details, gate and seat number printed on it. Usually, the check is a visual check performed by a security officer who checks that the passenger name on the boarding pass matches the passenger name on the passenger's passport.

Currently in airports, it takes, on average, anywhere from 20 to 40 minutes to complete an aircraft boarding for an international flight, depending on the size of the aircraft and the number of passengers.

In order to board an aircraft, an agent stands in front of the boarding gate and lets each passenger board the aircraft, one at a time, after verifying his boarding pass and a form of identification.

The verification process that usually takes place is for the agent to look at the person's face, look at the passport, then look at the boarding pass and to place the boarding pass onto a reader for scanning, so that the Departure Control System can be updated. This process can take about 5 to 25 seconds per passenger to perform.

As part of the scanning process, data is read from a MRZ on a page of the passport by opening the passport and placing it on an optical reader, which performs Optical Character Recognition (OCR) on the MRZ. Optical Character Recognition is the mechanical or electronic translation of scanned images of printed text into machine-encoded text.

In addition to the amount of time taken to process each passenger, the required infrastructure to scan is quite large since a space for a desk, a full personal computer, and a printer and a scanner are required.

SUMMARY OF THE INVENTION

The invention is defined in the appended claims to which reference should now be made. Embodiments of the invention seek to address the above problems by providing an improved user control system comprising reading means, preferably optical, for reading user data from a user identity document and for reading further user data from a token associated with a product or service; display means for displaying a field of view for the agent; wherein in response to the agent positioning the user identity document and token within the field of view, the reading means reads the user data from the document and reads the further user data from the token; and processing means such as an integrated circuit for comparing the user data and further user data.

Thus, boarding pass and passport reading is more streamlined and results in faster throughput of passengers through security or at boarding.

Embodiments of the invention seek to reduce the time to process passengers at boarding by reducing the processing time of each passenger to between 1 to 5 seconds.

Embodiments of the invention also seek to increase the accuracy of face recognition check against the ID, since an agent can look at the passenger while the scanning of an identity document and token is being made in parallel, resulting in a reduction of cases where a wrongful passenger could board a plane.

Embodiments of the invention also reduce the amount of infrastructure needed at the boarding gate because only a portable computing device such as a wearable or hands-free device, for example a pair of computing glasses, are required. In some embodiments, the system further comprises an optional portable communication device such as a mobile telephone. The portable communication device may wirelessly communicate with the wearable or hands free computing device. The communication device may comprise a memory for storing Departure Control System data. The stored data may comprise information associated with passengers who have been authorised to travel by the device as a result of the scanning and comparison process. The information may only comprise passenger data associated with a single flight or leg of a journey. Preferably, the agent may also be equipped a mobile or portable printer connected to the portable computing device via a communication link.

The pair of wearable computing glasses may be for use by an agent. The glasses may substantially simultaneously scan both the passenger's identity document and boarding pass and provide close-to-immediate feedback to the agent on a head-set display placed in front of the eye or eyes.

Usually, the wearable or hands-free computing device comprises a glass or pair of glasses having a Field of View which displays images in front of the eye with a simple, colour coded, status for passenger boarding. The device may have a small Field of View screen which may replace the current hardware necessary for boarding passengers.

The process of simultaneously scanning both the passport and boarding pass and then providing an immediate feedback to the agent is a lot faster than the current process, which means significant savings for airlines.

Embodiments of the invention improve the accuracy of matching the person's ID with their faces since it allows the agent to look at the passenger's face at the same time that the scanning is taking place to verify that the passenger corresponds to the image on the passport since the head set display is on the side and not intrusive.

Embodiments of the invention also have the advantage that the agent does not have to scan the boarding pass onto a reader at the departure gate, so the hardware at the gate does not need to update the Departure Control System (DOS). Embodiments of the invention may also comprise a Departure Control System (DCS) update which may be made via a mobile telephone or other portable communication device connected via a communication link to back end systems.

BRIEF DESCRIPTION OF THE DRAWINGS

An embodiment of the invention will now be described, by way of example only, and with reference to the accompanying drawings, in which:

FIG. 12 is a schematic diagram showing use of an embodiment of the invention which expedites check in;

The following description is of a system for use in the aviation industry, but this is exemplary and other applications of the invention will also be discussed. For example, the control system may be used in any environment where security or other procedures require a user's identification document and a token for providing a service to the user to be authenticated as belonging to the user before a product or service is provided to the user. Thus, embodiments of the invention find application in the travel industry in general. The control system may also be used in any environment in which quick and accurate a comparison needs to be made between two documents. Thus, embodiments of the invention have particular application in the travel industry (for example rail, air, coach and the like), but also in the ticketing industry, such as ticketing for theatre, cinema, and the like.

Figures 1, 2:
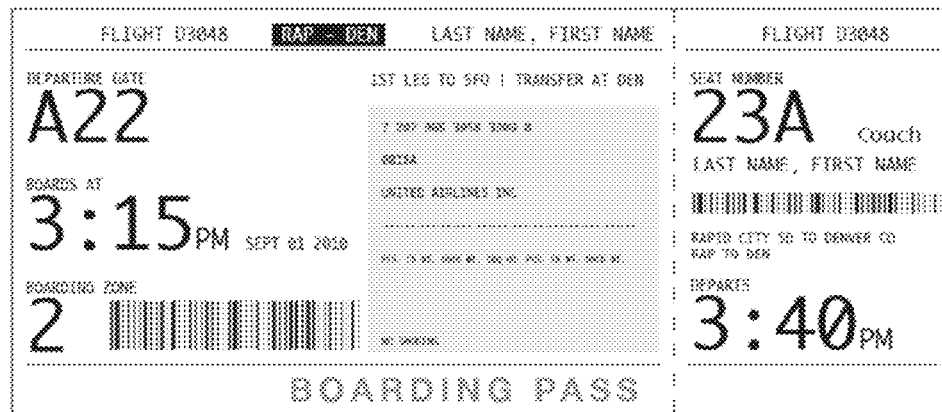
FIG. 1 shows a data page of a passport including a Machine Readable Zone.
FIG. 2 shows a boarding pass for use with embodiments of the invention.

FIG. 1 of the accompanying drawings shows a data page of a passport which is divided into a number of zones. A Visual Inspection Zone is located in the upper half of the page and contains data not specifically intended to be read by machine. A MRZ of the passport is located in the bottom half of the data page and contains data which is both human readable and machine readable.

The MRZ data may comprise: a user name, and surname, the document number, the date of expiry and, optionally, the date of birth of the user. Below is an example of the data contained in the MRZ of the passport, although some personal details have been blanked out with an X:

P<TRLSMITH<<<<JOHN<<<<XXXX<<<<<<<<
<<<<<<<<<<<<
PC12345670IRL7903130M1711157<<<<<<<<<<<<<<<<4

The data within the MRZ may be structured as 2 lines of alphanumeric characters. The data on each line may be separated by one or more filler characters which may be represented by <. Each line of data may be 44 characters in length.

The alphanumeric data in this field may have the following format:

A 9 character Alphanumeric Passport Number. If the passport number is less than 9 characters, then the remaining characters may be padded with the character "<", for example: "ABC123XY<".

A 6 character numeric date of birth in YYMMDD format, for example "720823".

A 6 character numeric date of expiry in YYDDMM format, for example, "210922".

Referring now to FIG. 2, this shows a boarding pass for use with embodiments of the invention. The boarding pass comprises further user data, such as LAST NAME, and FIRST NAME and may also comprise data such as departure gate, boarding time, boarding zone, seat number, coach, departure time boarding time.

Information encoded on or within the boarding pass may be encoded as a 2D bar code or as an electronic boarding pass including the 2D bar code.

The data is then rendered into a bar coded boarding pass. A Near Field Communication (NFC) boarding pass may have the information in alphanumeric format.

Operation of the control system 300 will now be described referring to FIGS. 3 to 10 of the drawings. In use, the components shown within the dashed line 300 of FIG. 3 may be located at an airport, although embodiments of the invention may find application outside the airport environment, as previously described.

Figure 3:
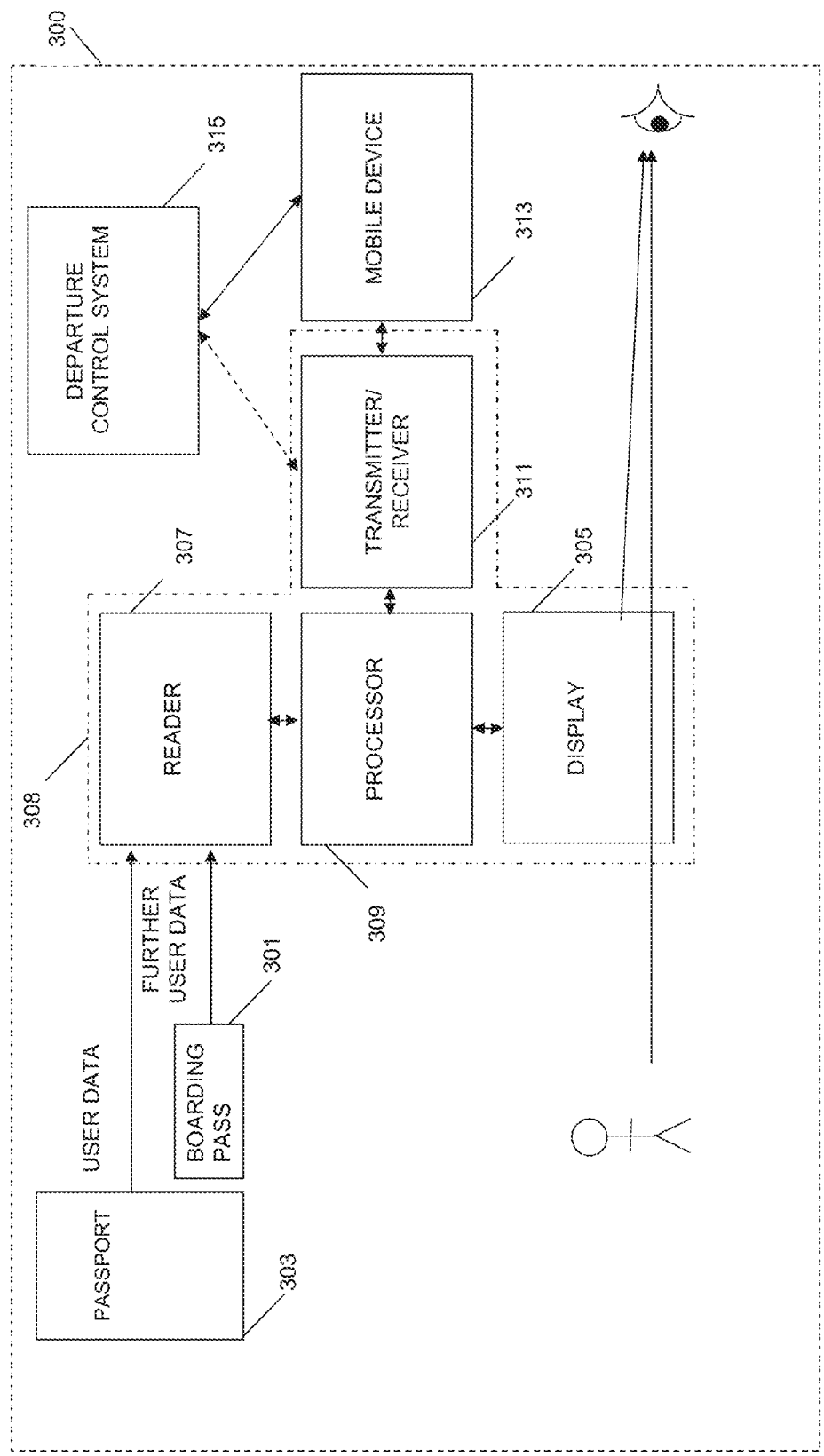
FIG. 3 is a schematic diagram of the main functional components of an embodiment of the invention.

The following description of a preferred embodiment refers to a pair of smart glasses or wearable computing glasses 308, although this is not essential since embodiments of the invention may be performed with a heads-up-display and the like, or may be embodied in a smart telephone and the like. Referring now to FIG. 3, this shows the main functional components of a system 300 embodying the invention.

The system 300 comprises a reader or scanner 307, processor 309 and transmitter-receiver 311, display 305 which may be integrated into a wearable or portable computing device 308 or other portable communications device. As shown by the arrows in FIG. 3, each of the reader, display, and transmitter is communicatively coupled to the processor. A power source, not shown in FIG. 3, such as a battery may also be provided.

The embodiment shown in FIG. 3 also includes a mobile device 313 associated with an agent using the control system, for example located on or near the agent, however this is optional. Further, a departure control system 315 may also be included, which may be communicatively coupled to the transmitter receiver 311 or mobile device 313 or both.

The following description assumes that a user has been issued with a token or boarding pass 301 for travel, such as that shown in FIG. 2 of the drawings. In some embodiments, this may be a conventional paper token or boarding pass, but in other embodiments, associated with each user is a token storage medium such as a portable or mobile device which is capable of storing a boarding pass such as an electronic boarding pass or e-boarding pass. The boarding pass may be thought of as a token which is issued by a service provider to a user which allows the user receive the service in return for payment. The token may comprise an NFC boarding pass, a paper boarding pass, a paper bag tag attachable to a piece of baggage or an airline ticket.

Usually, the token or boarding pass is provided by a server which is wirelessly coupled to a user's mobile device, for example, using a wireless communications network, but in principle, any communications means, such as a wired network may be used provided the e-boarding pass can be transferred to, and stored on the user's mobile device.

When a check, such as a security check, is being performed on a passenger, for example at a boarding gate or at security station, an agent wears the portable computing device 308 such as a pair of smart glasses or wearable computing glasses. The device is usually a hands-free device so that it is wearable by the agent allowing the device to perform a check without the need for the agent to manually hold the device.

Usually, the computing device 308 is initially in a standby mode where the device or glasses are worn, but boarding has not yet started. The agent then activates the device 308 by pressing a button on the glasses or device 308 or using a voice activated command which is recognised by voice recognition software operable by the device, and the agent can then start the boarding process. Suitable voice recognition software will be known to the skilled person. The agent may open a software application stored on the device, which then loads from a memory.

Figure 4:
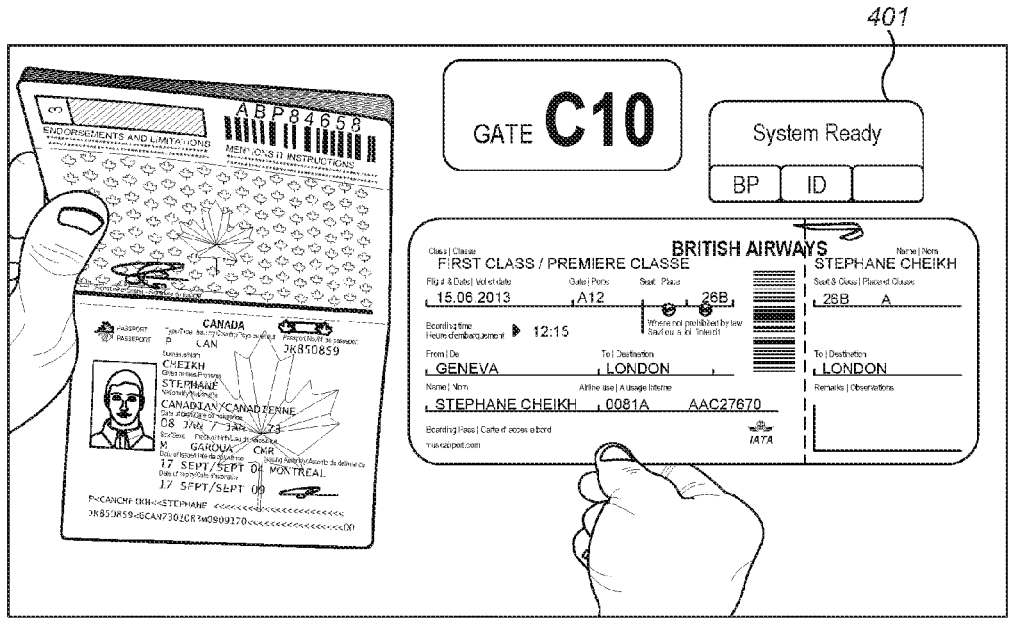
FIG. 4 shows the view seen by a user of an embodiment of the invention in which the system is ready for use.

FIG. 4 shows a view seen by an agent using an embodiment of the invention in which the system is ready to start the process of boarding passenger one-by-one. The view seen by the agent may included a user interface 401 displayed by the device 308 using the display means. The display means may comprise one or more lenses and a projector for producing a heads-up display where a projected image is displayed or overlaid on another image seen by a user.

The agent receives the proper documentation from each passenger and then holds the passenger ID and boarding pass in front of his eyes. For convenience, the documents are usually held at arms length distance for scanning of both documents. Usually, the device is located between the agent and the documents being scanned. Further, usually a portion of the device is substantially transparent so that the user can see images through a portion of the device. The agent may look at both documents for the scanning process to start. For example, eye movement recognition software, which will be known to the skilled person may be used to determine that the agent has looked at both documents, in order for the scanning process to be initiated. Further, in order to initiate scanning the user may position the passport 303 and boarding pass within a Field of View of the device 308 or a predetermined region of the display as seen by the agent when using the device. Once again, suitable object recognition positioning software known to the skilled person may be used in order to determine that the passport and boarding pass have been positioned within a predetermined Filed of View.

The device 308 first scans the boarding pass 301 by reading or scanning the barcode contained on or within the boarding pass. The particular portion of the boarding pass being scanned is highlighted by rectangular box 501 shown in FIG. 5, although rectangular box 501 does not necessarily need to be displayed by the device 308.

Suitable boarding pass scanning processes will be known to the skilled person, such as BCBP (bar-coded boarding pass) scanning, BCBP defines the 2-Dimensional (2D) bar code printed on a boarding pass or sent to a mobile phone for electronic boarding passes. Airlines and third parties use a barcode reader to read the bar codes and capture the data. Reading the bar code usually takes place in the boarding process, but can also happen when entering the airport security checkpoints.

The device thus scans the boarding pass may extract the following information: Number of legs (each flight in your itinerary is a single leg). Passenger name, Electronic ticket number, Airline identifier, Airline booking reference (PNR), Departure city or airport, Arrival city or airport, Flight number, Date of flight, Seat Number, Passenger type (adult, male, female, child, infant . . . ), and Digital signature.

Usually, the device only uses the passenger name element for reconciliation.

The device may display a BP icon in a green colour to indicate that it was successful in extracting the passenger name. It may also display the passenger name on the heads up display.

Figure 6:
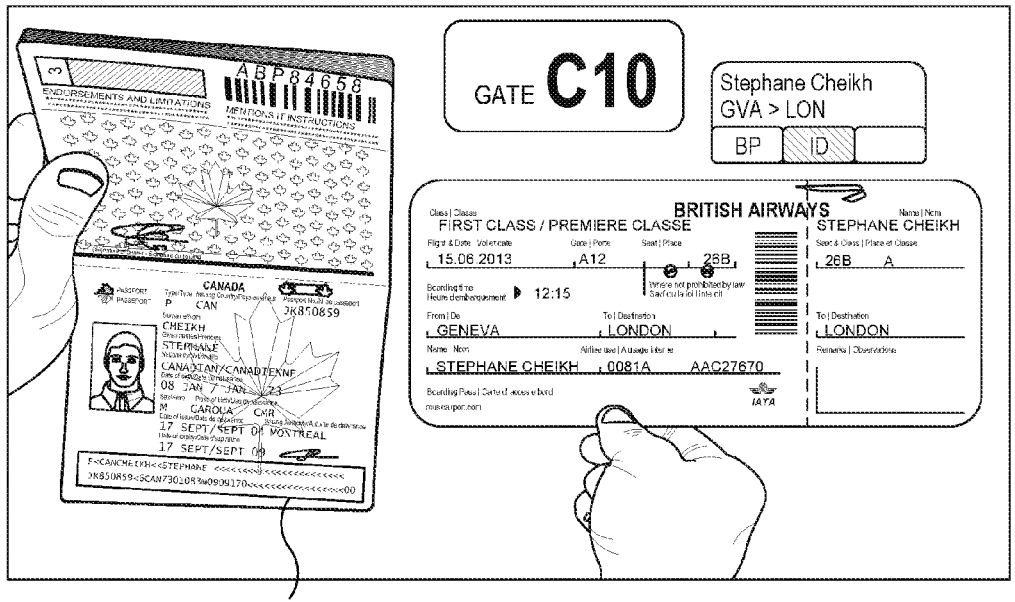
FIG. 6 shows the view seen by a user of an embodiment of the invention once the machine readable zone has been read from a passport.

The device may scan or read the passenger ID and boarding pass independent of the relative positions of the boarding pass and passport, such as whether one is on the left or right hand side. Thus, embodiments of the invention may be configured to recognize a type of barcode, and select a suitable scanning process dependent upon the detected data type and position of the data within the field of view. The device also scans the ID card/passport 303 by reading the alphanumeric characters contained within the MRZ of the passport, as shown in FIG. 6. The particular portion of the passport being scanned is highlighted by rectangular box 601 shown in FIG. 6, although rectangular box 601 does not necessarily need to be displayed by the device 308. Accordingly, the device scans the MRZ from the ID and may extract the following information from the first and second row of the MRZ. Table 1 below gives the format of the first row of the MRZ and data which may be read according to embodiments of the invention.

TABLE 1 the format of the first row of the MRZ.

| Positions | Chars | Meaning |
|---|---|---|
| 1 | alpha | P, indicating a passport |
| 2 | alpha | Type (for countries that distinguish between different types of passports) |
| 3-5 | alpha | Issuing country or organization (ISO 3166-1 alpha-3 code with modifications) |
| 6-44 | alpha | Last name, followed by two filler characters, followed by Given names. |

Table 2 below gives the format of the second row of the MRZ and data which may be read according to embodiments of the invention.

TABLE 2 the format of the second row of the MRZ.

| Positions | Chars | Meaning |
|---|---|---|
| 1-9 | alpha + num | Passport number |
| 10 | num | Check digit over digits 1-9 |
| 11-13 | alpha | Nationality (ISO 3166-1 alpha-3 code with modifications) |
| 14-19 | num | Date of birth (YYMMDD) |
| 20 | num | Check digit over digits 14-19 |
| 21 | alpha | Sex (M, F or < for male, female or unspecified) |
| 22-27 | num | Expiration date of passport (YYMMDD) |
| 28 | num | Check digit over digits 22-27 |
| 29-42 | alpha + num | Personal number (may be used by the issuing country as it desires) |

TABLE 2-continued the format of the second row of the MRZ.

| Positions | Chars | Meaning |
|---|---|---|
| 43 | num | Check digit over digits 29-42 (may be < if all characters are <) |
| 44 | num | Check digit over digits 1-10, 14-20, and 22-43en names are separated by single filler characters |

Usually, the device only uses the Last name, followed by two filler characters, followed by Given names elements for reconciliation.

The scanning process may be reversed, for example, the passport may be scanned first and then the boarding pass so that scanning order is interchanged.

Figure 5:
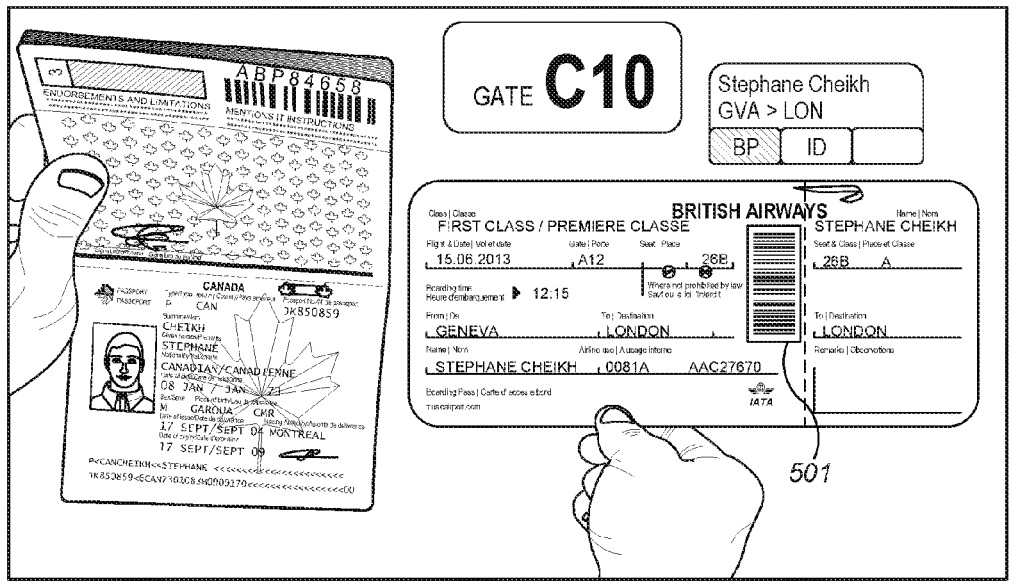
FIG. 5 shows the view seen by a user of an embodiment of the invention once the boarding pass has been scanned.
Figure 7:
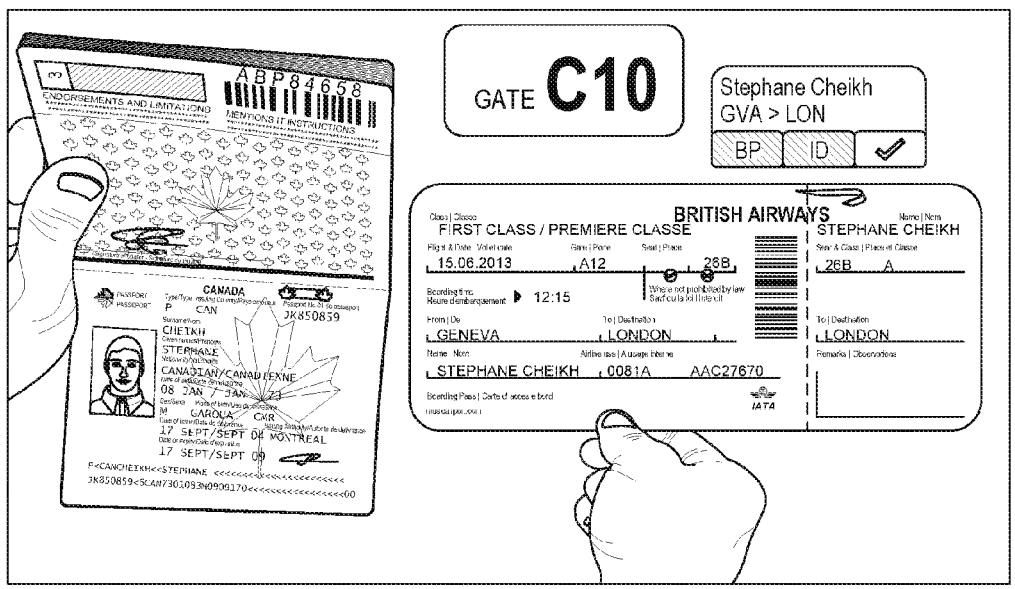
FIG. 7 shows the view seen by a user of an embodiment of the invention in which the system has determined that there is a match between the boarding pass and identification document.

Preferably, the device displays an ID icon in a green colour to indicate that it was successful in extracting the Last name, followed by two filler characters, followed by Given names. It may also display the passenger name on the heads up display, as shown in FIGS. 5 to 7 of the drawings.

Suitable passport scanning processes will be known to the skilled person, such as Machine Readable Zone (MRZ) scanning. Thus, embodiments of the invention may read a Readable Travel Document (MRTD) such as Machine Readable Passport (MRP) where the data on the identity page is encoded in optical character recognition format. Most travel passports worldwide are MRPs having a MRZ, which is usually at the bottom of the identity page at the beginning of a passport. Usually the passport is a Type 3 travel document where the Machine Readable Zone spans two lines and each line is 44 characters long.

Thus, a user's name, passport number, nationality, date of birth, sex, passport expiration date and personal identity number are often provided in the MRZ. Optional, and often country dependent supplementary information may be included in the MRZ.

Usually, the device scans both the boarding pass and the ID cardpassport simultaneously. The processor then compares the user data read from the user identity document and the further user data read from the token.

The device may also determine the location, usually by reading gate data using a scanning process as previously described. Further, the gate number may also be read from the boarding pass so that a check may be made between the gates number shown in FIG. 5 and the gate data read from the boarding pass. This prevents someone with matching boarding pass and passport from boarding the wrong flight at the wrong gate.

The scanning system then provides feedback in the field of view once:

1. The ID document is successfully read and checksums in MRZ are correct and
2. The BP barcode is successfully read and checksum (if applicable) matches.

Field of View

The user interface in the field of view may comprise a split display with area for boarding pass on left and ID card on right part of the field of view, as shown in FIGS. 4 to 10 of the drawings. These areas may be inter-exchangeable if the agent holds the ID and boarding pass in different hands each time, and the scanning algorithm may be configured to search for the barcode as a way of determining whether the boarding pass is on the left or right.

Further, embodiments of the invention overlay a visual colour indicator in accordance with the following rules:

1. Green: once ID document is successfully read and checksums in MRZ are correct
2. Green: once BP barcode is successfully read and checksum (if applicable) matches
3. Green: if name in MRZ matches exactly the name in barcode
4. Orange: if name of MRZ matches barcode name MRZ but there are some issues around first/last name order, accents and other non conformities i.e Ü=U, o=ö.
5. Red: if no match is returned. The option of re-scanning or move to manual process is available to the agent.

Referring now to FIGS. 7 to 10, these figures include an extract from the Field of View of the device 308, with information being displayed in the field of view depending upon the result of the matching process.

FIG. 7 is a schematic diagram showing how the device 308 has simultaneously scanned both the passport and boarding pass by as a result of the user orientating the boarding pass and passport into the field of view of the device. In this case, the processor has determined that there is an exact match between the text read from the boarding pass and the text read from the passport, resulting in all of the text displayed within the user interface being displayed in Green. Further, the user interface outline may also be coloured green and the tick associated with the boarding pass text or passport text within the user interface may also be coloured green.

Accordingly, the device has extracted the information required to complete reconciliation between the data returned from the ID and the boarding pass. Reconciliation may be made using a checksum from the data returned from the ID and the boarding pass. The checksum used by embodiments of the invention may be a small-size datum computed from a block of digital data for the purpose of detecting errors that may have been introduced during its transmission or storage.

The reconciliation process verifies the integrity of the data is checked on the fly and in real time. If the checksums match, the data was likely not accidentally altered.

The device may display a last icon on the left of the user interface in a green colour with a check mark to indicate that the passenger is approved for boarding.

Embodiments of the invention may reset after a successful scanning process in order to scan the next passenger in line. Embodiments of the invention may also generate a list of individual passengers that have boarded. This list may then be wirelessly transmitted over the air, for example using WIFI, Bluetooth or another other communications means to the DCS (Departure Control System) for an update.

Figure 8:
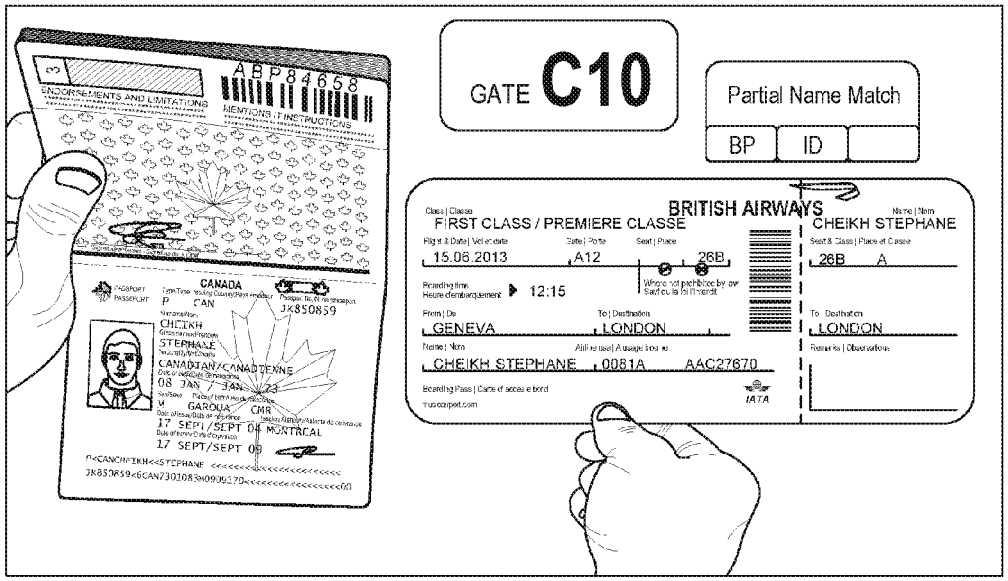
FIG. 8 shows the view seen by a user of an embodiment of the invention in which the system has determined that there is a partial match between the boarding pass and identification document.

FIG. 8 shows a partial match case where once the agent has simultaneously scanned both the passport and the boarding pass, a determination is made as to whether there are any ambiguities between the data read from the boarding pass and the data read from the passport, then this is flagged as a partial match.

For example, embodiments of the invention classify a partial match as a case in which it is determined that passport has the user's name written as FIRSTNAME SURNAME and that the user's name written as SURNAME FIRSTNAME on the boarding pass. Alternatively, or in addition, embodiments of the invention may classify a partial match as a case when the system determines that user's name is written including any accents on the passport but without the corresponding accents on the boarding pass, then this will also be flagged as a partial match.

In one specific example, if user's name is written as Stephane Cheikh on their passport and Cheikh Stephane on the boarding pass, then this will be considered as a partial match, since the data read from the 2 documents corresponds, but is at least partially reversed in sequence. Further, a partial match may also be determined if a user's name such as Stephane Cheikh is written on the passport and but it is written as Stephane Cheikh on the boarding pass.

In this case, the tick next to the text boarding pass in the box labelled "PARTIAL NAME MATCH" in FIG. 8 may be coloured in red.

Figure 9:
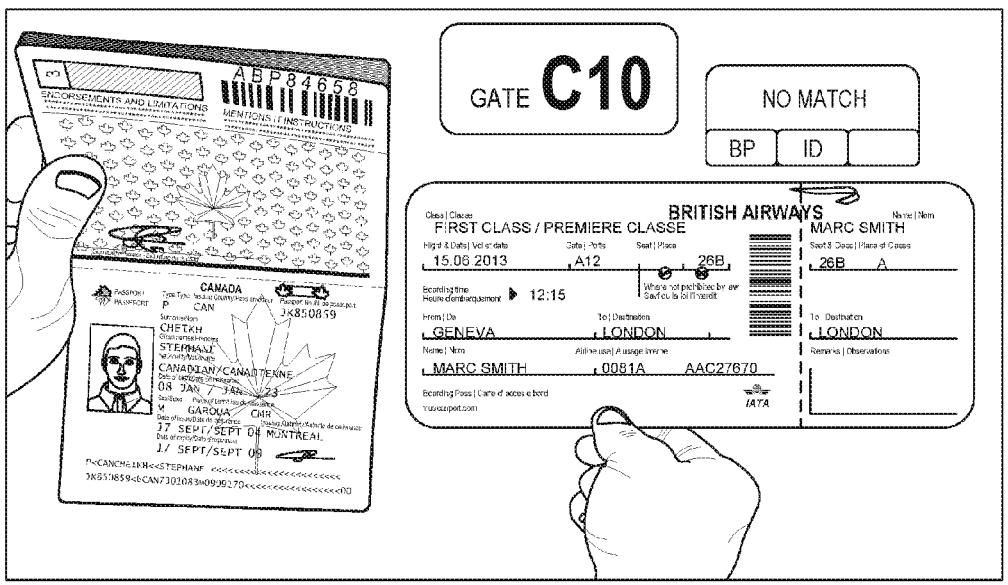
FIG. 9 shows the view seen by a user of an embodiment of the invention in which the system has determined that there is no match between the boarding pass and identification document.

FIG. 9 shows a case in which there is no match between the data read from the passport and the boarding pass. No match may occur if both the first name and surname do not match. For example, the device may determine that no match occurs if the name on the passport is STEPHANE CHEIKH and the name on the boarding pass is MARC SMITH. Once the agent has simultaneously scanned both the passport and ID, if there is a no match in the name, there will be a red coloured status. The agent may then retry the scanning process or move to a manual process via mobile device 313 such as a mobile telephone.

The mobile telephone may include an application that allows for manual boarding of the passenger and automatic update of the DCS in the case of no match.

The system may further comprise a Departure Control System. The Departure Control System (DCS) automates processing an Airlines' Airport management operation. This includes managing the information required for Airport Check-in and printing Boarding card, cargo load control and aircraft checks.

Further, the Departure Control System 315 does not necessarily need to be located at an airport, since it may communicate with the device 307 via wired or wireless means known to the skilled person.

The agent may carry a mobile telephone 313 or other portable computing device that interfaces between the device and back end systems. The systems the mobile application will potentially be connected to are Reservations and Departure Control systems. Data is wirelessly sent from the device to the mobile device worn by the agent. The data sent may include passenger name, seat number and flight information.

Embodiments of the invention may also connect to a loyalty program system and display the passenger tier on the glass upon boarding for better customer greetings of VIP passengers.

In some embodiments, the passport may be pre-stored on the mobile telephone. The passport may be stored in a secured or unsecured manner in the mobile telephone or other portable communication device. Thus, in some embodiments, the passport information is provided by a mobile telephone. Further, the security check matching may occur when the travel document such as the boarding pass is sent, or when checking-in.

Figure 10:
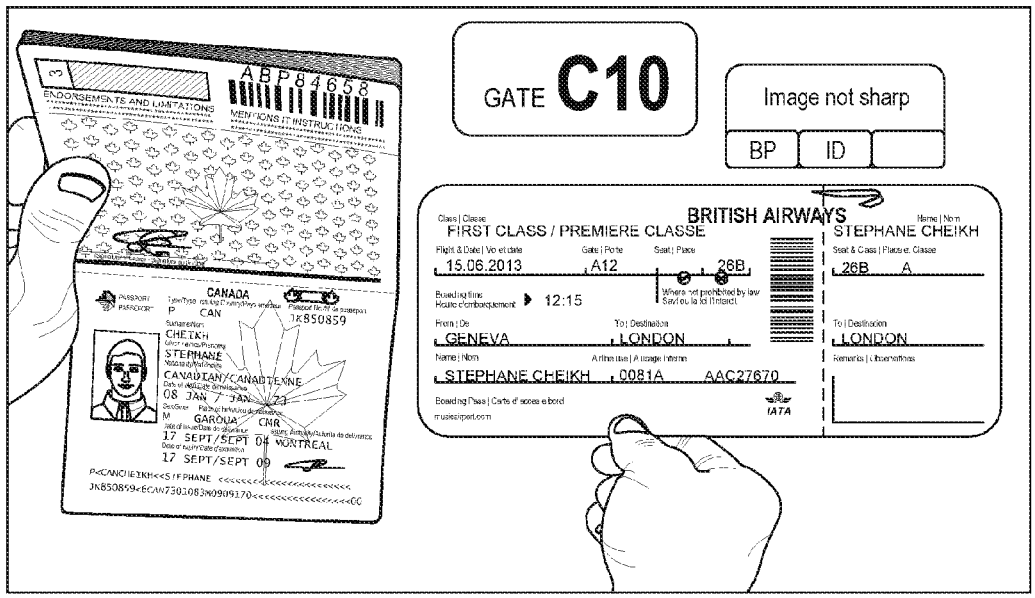
FIG. 10 shows the view seen by a user of an embodiment of the invention in which the system has determined that there is an error in the reading process.

FIG. 10 shows an error message which may be displayed by embodiments of the invention. In FIG. 10, the error message indicates that the image is not sharp, but embodiments of the invention may also be configured to handle multiple error messages that may be displayed on the heads up display while using the application.

The following error messages may be displayed:
1. "Image not sharp"
2. "Image overexposed"
3. "Image underexposed"
4. "Focus failed"
5. "Device moving too much"
6. "Focus triggered"
7. "Focus set"
8. "Barcode cannot be extracted."
9. "MRZ not found."
10. "NAMES DO NOT MATCH"
11. "PARTIAL MATCH"

After one or more of these messages have been displayed, embodiment of the invention may search for the barcodeMRZ again, for example after a few seconds.

Figure 11:
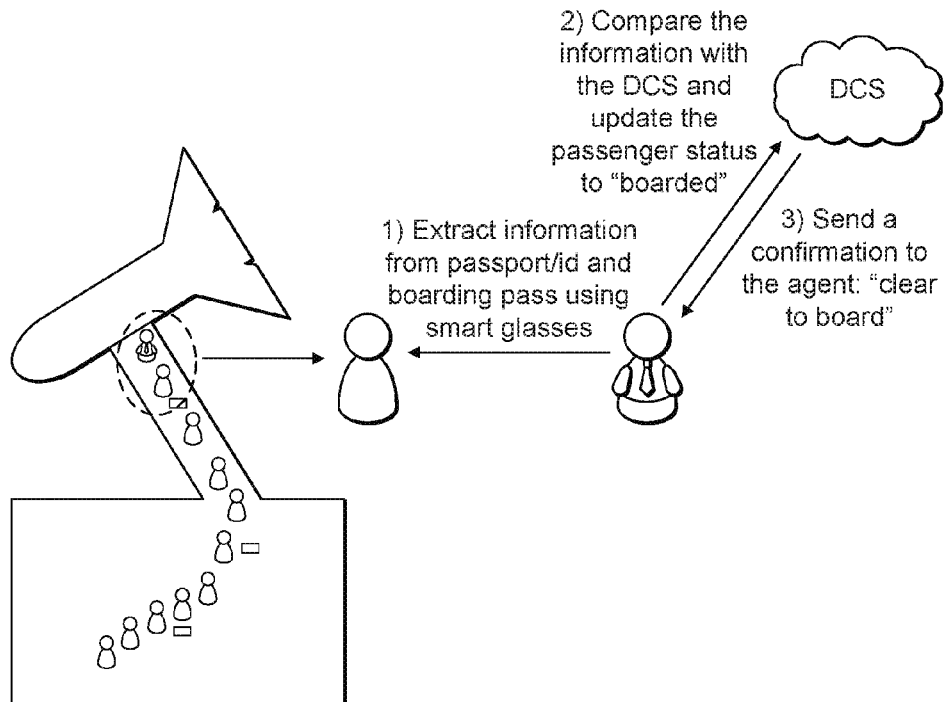
FIG. 11 is a schematic diagram showing use of an embodiment of the invention for flight attendant boarding at the entrance to an aircraft.

FIG. 11 is a schematic diagram of use of the control system for boarding of an aircraft by flight attendants at an entrance to the aircraft, removing the need for boarding passengers at the gate. This can lead to significant cost savings.

As shown in FIG. 11, a flight attendant is equipped with the control device and waits for passengers in front of the aeroplane. Each passenger is asked for his boarding pass and passport/identification. Both documents are scanned as previously described, and the information is compared. If there is a match, an update is sent to the DCS and the passenger is cleared to board. Otherwise, manual action needs may need to be taken, such as boarding using a mobile application.

Embodiments of the invention may also find application with Transportation Security Administration, TSA agents in the United States.

For every passenger going through security, a TSA agent verifies that the passenger boarding pass and ID match. In this scenario, the TSA agent will use the wearable computing device to scan both the boarding pass and ID instead of manually checking both documents.

In a scenario when the passenger holds a Mobile Boarding pass, the TSA agent may manually scan the Mobile Boarding pass.

Figure 12:
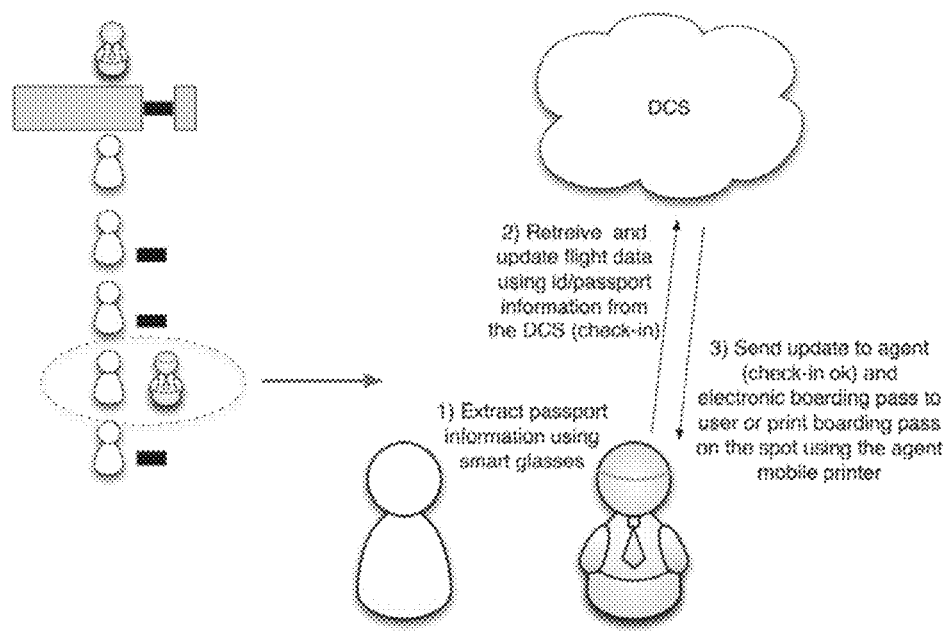

FIG. 12 is a schematic diagram of use of an embodiment of the invention which expedites check-in.

For example, there may sometimes be a long line to check-in at the airport. While some passengers have bags to check in and thus need to go through the regular process, some of passengers may only be travelling with carry-on luggage. Embodiments of the invention may be advantageously used to allow such passengers to be checked-in faster.

For example, an agent equipped with smart glasses according to embodiments of the invention may go through a check-in line to see if some passengers are travelling only with a carry-on luggage.

When such passenger is found, the agent looks at his passport/id that is scanned according to embodiments of the invention. Embodiments of the invention may extract passport information. This information may then be forwarded to a DOS, which is updated. The update may comprise information indicating that say a particular passenger X has checked-in.

A mobile boarding pass is then sent to the passenger's mobile device. Consequently, the passenger may then proceed to security. If a mobile boarding pass is not available, then agent may be equipped with a wearable printer to print the boarding pass on the spot.

Figure 13:
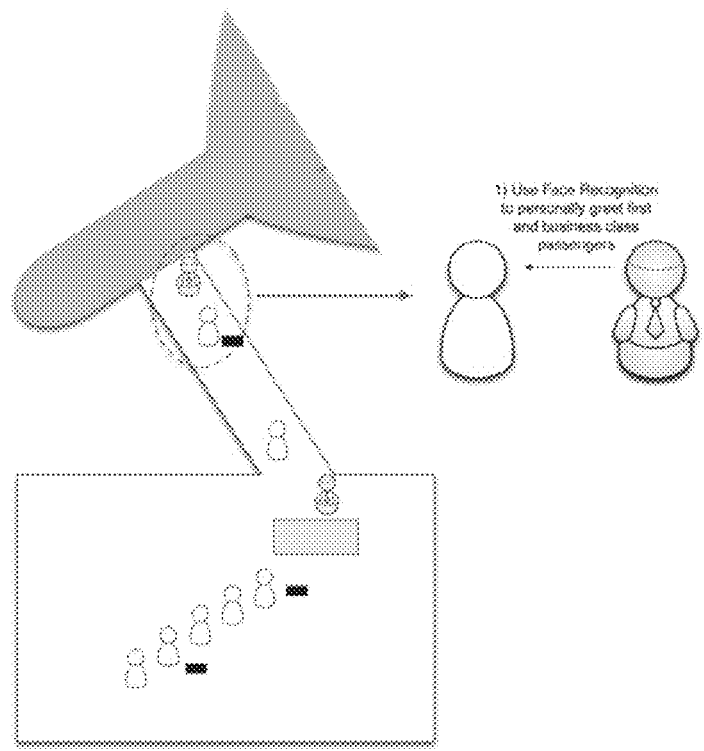
FIG. 13 is a schematic diagram showing use of an embodiment of the invention by a flight attendant for greeting passengers.

FIG. 13 is a schematic diagram of use of an embodiment of the invention by a flight attendant for greeting passengers. For example, each first and business class passenger may be greeted by name before entering the plane.

The face of every incoming passenger is scanned and compared to the picture of the first and business class passengers checked-in for the flight. The picture may be gathered via the Internet prior to this. When there is a match, the name and seat of the passenger is displayed on the head mounted display, allowing the flight attendant to greet personally the passenger.

Figure 14:
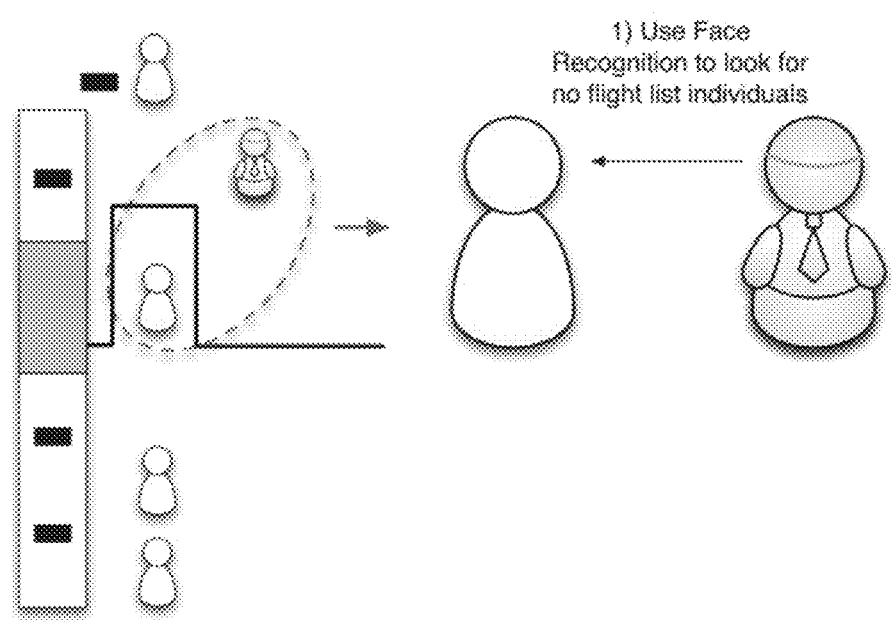
FIG. 14 is a schematic diagram showing use of an embodiment of the invention by a security agent at a security checkpoint.

FIG. 14 is a schematic diagram of use of an embodiment of the invention by a security agent at a security checkpoint. For every passenger going through security, face recognition is used to make sure that this individual authorized to travel. Using the device, the incoming passenger's face may be compared with one or more pictures of people who are not authorized to travel and the device may look for a match. For example, it may be necessary to compare 1 image with 100,000 images of people not authorised to travel.

The following numbered clauses are hereby included to give further description of various aspects of the invention:

1. A portable control system for use by an agent in the travel industry and the like comprising:
   reading means, preferably optical, for reading user data from a user identity document and for reading further user data from a token associated with a product or service;
   display means for displaying a field of view for the agent;
   wherein in response to the agent positioning the user identity document and token within the field of view, the reading means reads the user data from the document and reads the further user data from the token; and
   processing means such as an integrated circuit comparing the user data and further user data.
2. A control system according to clause 1 wherein the data and further data comprise alpha-numeric characters,
3. A control system according to any preceding clause wherein the data and further data are decoded according to two different coding standards preferably comprising machine readable zone data associated with an identity document and barcode data associated with the token.
4. A control system according to any preceding clause wherein the reading means is arranged to read the data and further user data substantially simultaneously.
5. A control system according to any preceding clause wherein the processing means is arranged to determine a match between the user data and further user data if the user data corresponds to the further user data.
6. A control system according to any preceding clause wherein the processing means is arranged to determine a partial match between the user data and the further user data based on whether the order of a plurality of fields within the data corresponds to the order of a plurality of fields within the further user data,
7. A control system according to any preceding clause wherein the processing means is arranged to determine a partial match between the user data and the further user data based on whether the data corresponds to the further user data with the exception of any non-matching characters within the data or further user data which differ only by virtue of the inclusion of an accent,
8. A control system according to any preceding clause wherein the processing means is arranged to generate an indicator for display in the field of view dependent upon the result of the comparison.
9. A control system according to any preceding clause further comprising transmission means for transmitting the indicator preferably wirelessly to a portable communication device associated with the agent.
10. A control system according to any preceding clause in which the user identity document is a passport or identification card and wherein the token comprises a boarding pass and preferably in which the control system is configured for passenger boarding of an airplane.
11. A control system according to any one of clauses 1 to 8 or 10 further comprising a portable communication device associated with the agent and preferably wherein the portable communication device is arranged to receive the indicator or a further indicator generated by the processing means.
12. A control system according to any one of clauses 1 to 8 or 10 further comprising a portable communication device associated with the agent, and wherein the communication device is arranged to store at least a subset of data associated with a departure control system, DCS, for storing data associated with the control system,
13. A control system according to clause 10 wherein the portable communication device is communicatively coupled to the control system and preferably wherein the portable communication device is further communicatively coupled to a remote departure control system.
14. A control system according to clause 10 wherein the communication device is arranged to store a subset of departure control system data stored on the remote departure control system.
15. A control system according to clause 7 wherein the control system is arranged to send data associated with the determined indicator to the portable communication device associated with the agent.
16. A control system according to clause 10 wherein the portable communication device is arranged to periodically send data to a remote departure control system after a predetermined number of comparisons have been performed by the device.
17. A control system according to any preceding clause in which the user identity document is pre-stored on a mobile communication device such as a portable telephone, preferably in a secured manner and wherein the mobile communication device is associated with the user,
18. A control system according to any preceding clause further comprising attachment means removably attachable to a user.
19. A control system according to any preceding clause further comprising a wearable or hands-free device removably attachable to a user.
20. A control system according to any preceding clause further comprising a wearable glass or pair of glasses.
21. A hands-free control system comprising the system of any preceding clause.
22. A control system according to any preceding clause in which the token further comprises user identification information and in particular in which the reader is further configured to read the user identification information from the token.
23. A control system according to any preceding clause further comprising a mobile device associated with a user for storing the token.
24. A control system according to any preceding clause in which the token is a boarding pass having the user identity document data encoded in a specific region of the boarding pass.
25. A control system according to any preceding clause further comprising a mobile device associated with a user for storing the token, wherein the mobile device comprises a near field communication, NFC, chip communicatively coupled with the mobile device for transmitting the token to the reader.

26. A control system according to any preceding clause in which the reading means is further configured to read location data and preferably in which the location data is departure gate data encoded in alpha-numeric format.

27. A control system according to any preceding clause wherein the reading means reads the data from a sign associated with a departure gate and preferably in which the reading means is further arranged to read departure gate information from the token and preferably to compare the departure gate information read from the sign with the departure gate information read from the token.

28. A control system according to any preceding clause further comprising reconciling data returned from the identity document scanning process and boarding pass scanning process.

29. A method for operating a control system for use by an agent in the travel industry and the like comprising:
reading, preferably optically, user data from a user identity document
reading, preferably optically, further user data from a token associated with a product or service;
displaying a field of view for the agent;
wherein in response to the agent positioning the user identity document and token within the field of view, the user data is read from the document and the further user data is read from the token; and
comparing, preferably using an integrated circuit, the user data and further user data.

30. A method according to clause 29 wherein the data and further data comprise alpha-numeric characters.

31. A method according to clauses 29 or 30 wherein the data and further data are decoded according to two different coding standards preferably comprising machine readable zone data associated with an identity document and barcode data associated with the token.

32. A method according to any one of clauses 29 to 31 wherein the reading means reads the data and further user data substantially simultaneously.

33. A method according to any one of clauses 29 to 31 further comprising determining a match between the user data and further user data if the user data corresponds to the further user data.

34. A method according to any one of clauses 29 to 31 further comprising determining a partial match between the user data and the further user data based on whether the order of a plurality of fields within the data corresponds to the order of a plurality of fields within the further user data.

35. A method according to any one of clauses 29 to 31 further comprising determine a partial match between the user data and the further user data based on whether the data corresponds to the further user data with the exception of any non-matching characters within the data or further user data which differ only by virtue of the inclusion of an accent.

36. A method according to any one of clauses 29 to 31 further comprising generating an indicator for display in the field of view dependent upon the result of the comparison.

37. A method according to any one of clauses 19 to 31 further comprising transmitting the indicator preferably wirelessly to a portable communication device associated with the agent.

38. A method according to any one of clauses 29 to 31 in which the user identity document is a passport or identification card and wherein the token comprises a boarding pass.

39. A method according to any one of clauses 36 or 38 further comprising receiving the indicator or a further indicator.

40. A method according to any one of clauses 29 to 36 or 38 further storing at least a subset of data associated with a departure control system, DCS, for storing data associated with a control system, 41. A method according to any one of clauses 29 to 31 wherein the portable communication device is communicatively coupled to the control system and preferably wherein the portable communication device is further communicatively coupled to a remote departure control system.

42. A method according to clause 41 further comprising storing a subset of departure control system data stored on the remote departure control system.

43. A method according to clause 37 further comprising sending data associated with the determined indicator to a portable communication device associated with the agent, 44. A method according to clause 40 further comprising periodically sending data to a remote departure control system after a predetermined number of comparisons have been performed.

45. A method according to any one of clauses 19 to 44 in which the user identity document is pre-stored on a mobile communication device such as a portable telephone and preferably in a secured manner and wherein the mobile communication device is associated with the user 46. A method according to any one of clauses 29 to 45 in which the token further comprises user identification information and in particular further comprising reading the user identification information from the token.

47. A method according to any one of clauses 29 to 46 in which the token is a boarding pass having the user identity document data encoded in a specific region of the boarding pass.

48. A method according to any one of clauses 29 to 47 further comprising reading location data and preferably in which the location data is departure gate data encoded in alpha-numeric format.

49. A method according to any one of clauses 29 to 48 further comprising reading the data from a sign associated with a departure gate and preferably further comprising reading departure gate information from the token and preferably comparing the departure gate information read from the sign with the departure gate information read from the token.

50. A method according to any one of clauses 29 to 49 further comprising reconciling data returned from the identity document scanning process and boarding pass scanning process.

The invention claimed is:

1. A portable authentication system comprising:
a reader for reading user data from a user identity document and for reading further user data from a token associated with a product or service, wherein the reader is arranged to read the user data and further user data substantially simultaneously;
a display for displaying a field of view for an agent;
wherein in response to the agent positioning the user identity document and token within the field of view, the reader is configured to read the user data from the user identity document and read the further user data from the token; and a processor for comparing the user data and further user data, wherein the processor is arranged to determine a match between the user data and further user data, if the user data corresponds to the further user data, and to determine a partial match between the user data and the further user data, based on whether an order of a firstname field and a surname field within the user data corresponds to an order of a firstname field and a surname field within the further user data or whether the user data corresponds to the further user data with exception of any non-matching characters within the user data or further user data which differ only by virtue of inclusion of an accent, and wherein the processor is further arranged to generate a partial match message for display, by the display, in the field of view if the partial match is determined between the user data and further user data.

2. A portable authentication system according to claim 1 wherein the user data and further user data comprise alpha-numeric characters.

3. A portable authentication system according to claim 1 wherein the user data and further user data are decoded according to two different coding standards, comprising machine readable zone data associated with the user identity document and barcode data associated with the token.

4. A portable authentication system according to claim 1 further comprising a transmitter for transmitting the partial match message to a portable communication device associated with the agent and wherein the portable authentication system is arranged to send data associated with the partial match message to the portable communication device associated with the agent.

5. A portable authentication system according to claim 1 in which the user identity document is a passport or identification card and wherein the token comprises a boarding pass and in which the portable authentication system is configured for passenger boarding of an airplane.

6. A portable authentication system according to claim 4 further comprising the portable communication device associated with the agent, wherein the portable communication device is arranged to receive the partial match message or a further partial match message generated by the processor.

7. A portable authentication system according to claim 1 further comprising a portable communication device associated with the agent, and wherein the portable communication device is arranged to store at least a subset of data associated with a departure control system, DCS, for storing data associated with the portable authentication system, wherein the portable communication device is communicatively coupled to the portable authentication system and wherein the portable communication device is further communicatively coupled to the departure control system and wherein the portable communication device is arranged to store a subset of the data associated with the departure control system.

8. A portable authentication system according to claim 7 wherein the portable communication device is arranged to periodically send data to the departure control system after a predetermined number of comparisons have been performed by the portable authentication system.

9. A portable authentication system according to claim 1 in which the user identity document is pre-stored on a mobile communication device in a secured manner and wherein the mobile communication device is associated with the user.

10. A portable authentication system according to claim 1 further comprising an attachment device for removable attachment to a user.

11. A portable authentication system according to claim 1 in which the token further comprises user identification information and the reader is further configured to read the user identification information from the token, wherein the token is stored on a mobile device associated with a user.

12. A portable authentication system according to claim 1 in which the token is a boarding pass having the further user data encoded in a specific region of the boarding pass, wherein the boarding pass is received by the reader of the portable authentication system via near field communication from a mobile device associated with a user.

13. A portable authentication system according to claim 1 in which the reader is further configured to read location data, wherein the location data is departure gate data encoded in alpha-numeric format.

14. A portable authentication system according to claim 1 wherein the reader reads sign data from a sign associated with a departure gate and in which the reader is further arranged to read departure gate information from the token and to compare the sign data read from the sign with the departure gate information read from the token.

15. A hands-free authentication system comprising the system of claim 1.

16. A method for operating a portable authentication system comprising:
    reading, at a reader, user data from a user identity document and, substantially simultaneously,
    further user data from a token associated with a product or service;
    displaying, at a display, a field of view for an agent;
    wherein in response to the agent positioning the user identity document and token within the field of view, the user data is read from the user identity document and the further user data is read from the token by the reader;
    comparing, at a processor, the user data and further user data;
    determining, at the processor, a match between the user data and further user data, if the user data corresponds to the further user data, and determining a partial match between the user data and the further user data, based on whether an order of a firstname field and a surname field within the user data corresponds to an order of a firstname field and a surname field within the further user data or whether the user data corresponds to the further user data with exception of any non-matching characters within the user data or further user data which differ only by virtue of inclusion of an accent; and
    generating, at the processor, a partial match message for display, by the display, in the field of view if the partial match is determined between the user data and further user data.

17. A non-transitory computer readable medium comprising instructions which when executed cause the method of claim 16 to be executed.

* * * * *